W. F. WARNOCK.
Zig-Zag Sewing-Machine.
No. 215,699. Patented May 20, 1879.
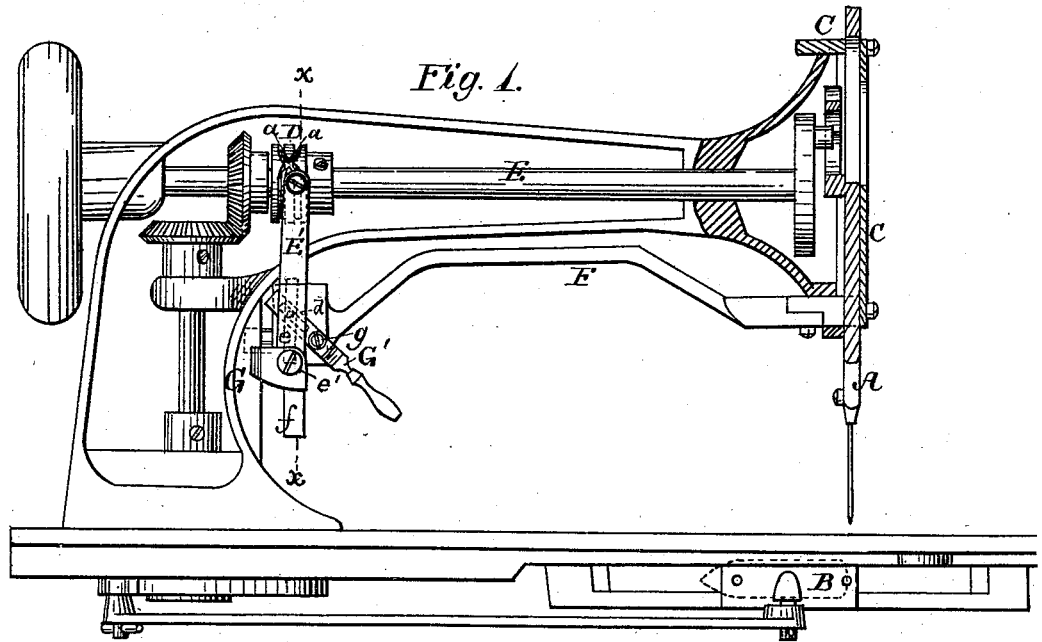
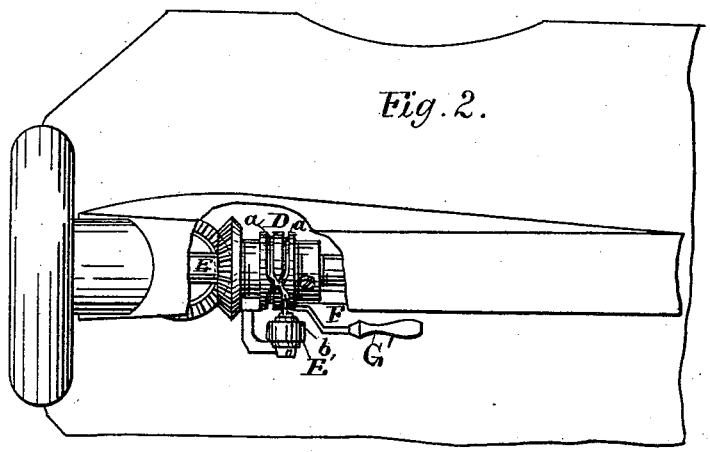
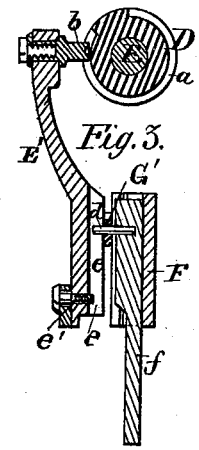
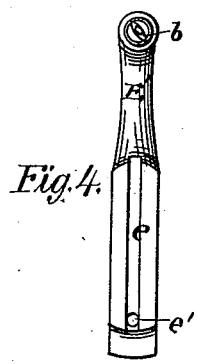
Witnesses:
Inventor:
Walter F. Warnock,
Sole assignee,
Thomas W. Morrison

UNITED STATES PATENT OFFICE.

WALTER F. WARNOCK, OF NEWARK, NEW JERSEY, ASSIGNOR TO THOMAS W. MORRISON, OF SAME PLACE.

IMPROVEMENT IN ZIGZAG-SEWING MACHINES.

Specification forming part of Letters Patent No. 215,699, dated May 20, 1879; application filed January 17, 1879.

*To all whom it may concern:*

Be it known that I, WALTER F. WARNOCK, of Newark, New Jersey, have invented certain new and useful Improvements in Zigzag-Sewing Machines, of which the following is a specification.

My invention is directed to a sewing-machine which may be used at will for making a straight or zigzag seam.

It has been my object to produce a machine adapted for family as well as general use, which shall be simple, free from complication, positive in action, and yet capable of adjustment, while continuing in motion, instantaneously to change from a straight seam to a zigzag seam, or vice versa, and also to vary or graduate the size of the zigzag seam gradually or rapidly, as may be required.

I make use of a needle-head—by which term I intend that part of the frame in which the vertically-moving needle-bar has its bearings—which is movable laterally or in a line at right angles to the line of feed, and with the head I combine mechanism for positively reciprocating it in this direction.

As a part of the motion-transmitting mechanism I employ a connecting device, which is movable to vary the length of lateral reciprocation, or to totally arrest said reciprocating movement, and I combine with the connecting device a lever, or its equivalent, for the purpose, by which the said connecting device may be adjusted at pleasure or as required by circumstances.

The nature of my invention and the manner in which the same is or may be carried into effect will be understood by reference to the accompanying drawings, in which—

Figure 1 is a sectional elevation of a lock-stitch sewing-machine embodying my improvements, the side of the goose-neck being broken away in part to expose the works. Fig. 2 is a plan or top view of a portion of the machine. Fig. 3 is a transverse vertical section of the needle-head-actuating mechanism on the line $x\ x$, Fig. 1. Fig. 4 is a detached view of the vibratory lever hereinafter referred to.

My improvements are applicable to the various types of sewing-machines now in the market.

The one that I have shown in the drawings in illustration of my invention is a well-known form of machine provided with the usual vertically-reciprocating needle-bar A, and with a horizontally-reciprocating shuttle, (indicated by dotted lines at B,) which moves at right angles with the line of the feed.

The machine, except as to the matters about to be described, is in all respects of the usual type, and requires no detailed description.

The vertically-reciprocating needle-bar itself differs from the ordinary bar in its arrangement, in that it has its bearings in a head, C, which is movable laterally—that is to say, in a line transverse to the line of feed. It is supported at top and bottom by horizontal flanges, which are seated in the front part of the goose-neck, and are adapted to move back and forth in guides or ways formed therein at the top and bottom.

It is my object to impart to this head positive movement laterally in both directions, and at the same time to combine with the mechanism by which this movement is imparted means by which either the length of reciprocation may be varied at pleasure, or the said movement may be totally suppressed.

The needle-head is operated through the instrumentality of a cross-groove cam, D, on the rotary needle-shaft E. The grooves are two in number, as shown at $a\ a$, and are similar. They are parallel with one another throughout the greater part of their length, but approach and cross one another at one point, as shown. The cross-groove cam is engaged by a properly-shaped stud, $b$, which is swiveled in and projects laterally from the upper end of a vibratory lever, E', whose pivot or fulcrum is at $e'$, on some fixed or stationary part of the machine. As the cam revolves, the stud is caused to travel first in one groove and then in the other, this being an arrangement of a well-known mechanical movement, and the lever thus obtains a laterally-vibratory movement. At a point between its fulcrum and the power it engages a connecting device, which, in this instance, is a laterally-projecting pin or stud, d, on the carrier or shifter-arm F. This arm is arranged to be capable of horizontal reciprocation, and is attached at its front end to the needle-head. It may, indeed, be considered a prolongation of the lower flange of the needle-head. It is supported in one or more suitable bearings. In this instance the bearing is formed in the bracket-arm G, which is fixed to the standard or upright part of the goose-neck, and supports the vibratory lever and parts connected therewith. The pin d is not positively fastened to the lever, but simply projects into a vertical groove, e, formed therein. In this manner the vibratory lever will communicate a positive movement of lateral reciprocation to the needle-head, the movement being so timed with relation to the movements of the stitch-forming mechanism that when the machine is in operation a zigzag seam will be formed.

In order to vary the said seam, to make it wider or narrower as occasion may demand, I make the connecting device d, which forms part of the movement-transmitting mechanism, adjustable to and from the fulcrum or axis of the lever E'.

When employing the general arrangement shown in the drawings, I find that one simple yet effective way of accomplishing my object is to attach the pin to a slide-bar, f, adapted, as shown, to move up and down in a socket or guideway formed in the rear end of shifter F. I can thus move the pin nearer to or farther from the fulcrum e', according as it is desired to lessen or increase the length of lateral reciprocation of the needle-head.

The slide may be moved by any suitable means—as, for instance, by a knob or handle projecting from it, or by a thumb-screw or any other convenient mechanical arrangement. The device, however, which I preferably employ with a view to effecting rapid changes of movement is a lever, G', which is pivoted at g to the carrier, with its handle end arranged in a convenient position to be reached by the operator, and with its other end longitudinally slotted and straddling the connecting-pin. By this means I can readily make a gradual or rapid adjustment for the purpose of varying the zigzag seam while the machine is in full motion without in any way checking or disturbing its action.

The length of movement of the slide is such that in its lowest position the connecting-pin will be brought opposite to and on the prolongation of the pivot or axis of vibration of the lever. When in this position the needle-head necessarily will be unaffected by the movement of the lever, and I can thus, during the continued operation of the machine, not only vary the zigzag seams, but change instantaneously from the zigzag to a straight seam, or vice versa.

In a machine in which positive lateral reciprocation is imparted to the needle-head it is essential, in order to vary the said movement, that some one of the devices which constitute the movement-transmitting mechanism—that is to say, the mechanism through the instrumentality of which movement is transmitted to the needle-head—should be adjustable with respect to those parts of the transmitting mechanism which it connects; and it is this which I intend by the term "connecting device."

It is manifest that the mechanical details of my improvements can be varied to a considerable extent. I do not, therefore, restrict myself to the particular construction and arrangement of instrumentalities herein described, as these will vary according to the position to be occupied by the laterally-reciprocating mechanism, to the particular devices used to make up that mechanism, and to the particular style of machine to which the mechanism is applied; but What I consider to be my invention is as follows:

1. The combination, with the needle-head and mechanism for imparting to the same positive lateral reciprocatory movement, of a connecting device adjustable while the machine is in motion to vary the length of reciprocation, or to totally arrest that movement, serving to change the seam from the ordinary straight seam to a zigzag seam, or vice versa, or to vary the zigzag seam, substantially as set forth.

2. The combination, with the needle-head and mechanism for laterally reciprocating the same, of an intermediate connecting device carried by the one and engaging without being fastened to the other, and adjustable independently of both, substantially as and for the purposes set forth.

3. The combination, with the needle-head and mechanism for laterally reciprocating the same, of an intermediate connecting device carried by the one and engaging without being positively fastened to the other, and movable independently of both, and an adjuster for varying the position of the connecting device, substantially as and for the purposes set forth.

4. The combination, with the laterally-movable needle-head and the vibratory lever for imparting lateral movements to the same, of a connecting device adjustable to vary the length of said movements, and adapted to be brought into line with the fulcrum or axis of said lever in order to arrest all lateral movement of the needle-head, substantially as set forth.

5. In combination with the needle-head and mechanism for laterally reciprocating the same, the slide-bar provided with a connecting-pin, or its equivalent, and mechanism for adjusting said bar, whereby the lateral movements of the needle-head may be varied in extent or be wholly arrested while the machine is in operation, substantially as set forth.

6. The laterally-movable needle-head, the slide-bar and connecting-pin, and the adjuster, in combination with the vibratory lever, the driving-shaft, and the cross-cut double-grooved cam thereon, substantially as and for the purposes set forth.

In testimony that I claim the foregoing as my own I hereto affix my signature in presence of two witnesses.

WALTER F. WARNOCK.

Witnesses:
OLIVER DRAKE,
GEO. BENSON.